June 10, 1947.   C. H. DUFFY   2,421,746
MASKING ATTACHMENT FOR PHOTOGRAPHIC CAMERAS
Filed Dec. 21, 1944   2 Sheets-Sheet 2

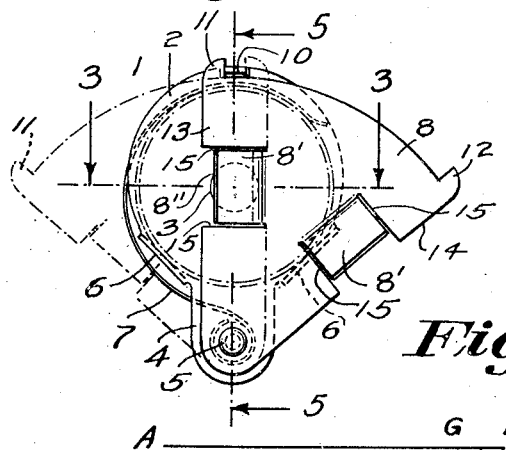
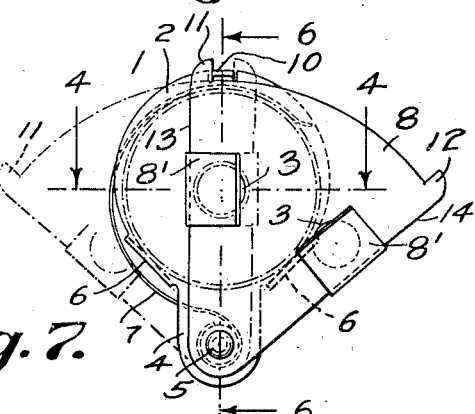
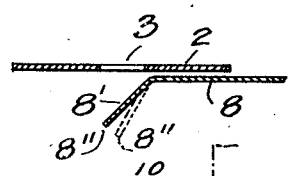
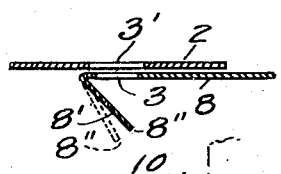
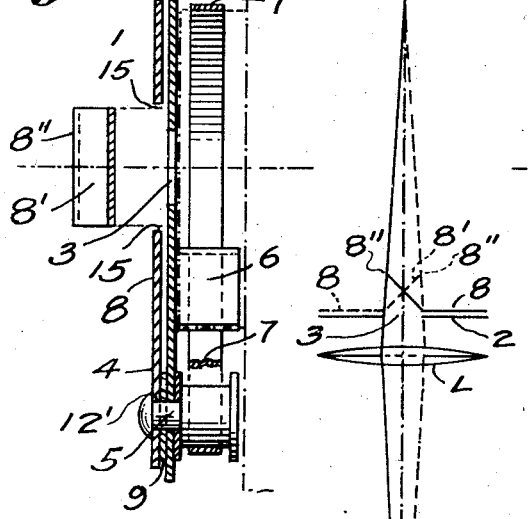
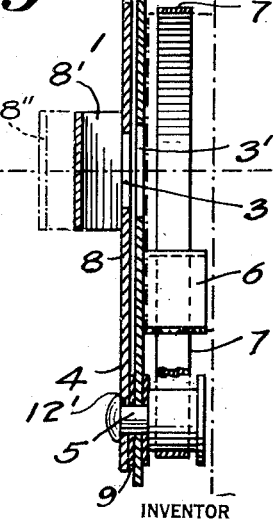

INVENTOR
CHARLES HUGH DUFFY
BY
J. F. Motherhead
ATTORNEY

Patented June 10, 1947

2,421,746

UNITED STATES PATENT OFFICE 2,421,746

MASKING ATTACHMENT FOR PHOTOGRAPHIC CAMERAS

Charles Hugh Duffy, Miami, Fla.

Application December 21, 1944, Serial No. 569,174

21 Claims. (Cl. 95—36)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to photography, and particularly to masking attachments for camera lenses, and is a continuation-in-part of application Serial No. 552,330, filed September 1, 1944.

The invention has for its object to provide a camera lens masking attachment for ready attachment to the lens barrel of a photographic camera whereby substantially one half of the field which normally is exposed to view and would normally be photographed upon exposure operation of a camera shutter is masked so that upon such exposure operation, that portion of the field of view which is masked is not photographed, the masking attachment being so arranged that the portion of the field of view which was masked upon such exposure operation of the camera shutter is then unmasked and the camera exposure shutter again operated to photograph on the same plate or film the previously masked portion of the field of view.

By use of this attachment, the same object may be photographed in different positions on the same plate or film, as for instance in the practice of photographing an individual in full face and in profile for purposes of identification and record.

In order that the two exposures of the film form a juncture which is not discernible on the photograph it is important that the two exposures overlap slightly but not excessively. If there is an excessive overlapping there is likely to be an area down the center of the photograph which will show evidence of overexposure. As the illumination diminishes at the edge margin of the exposed portion of the film where the light rays to the lens are gradually excluded by the mask, and as it is these less illuminated edge portions which form the overlap and are exposed twice, there is on the film no perceptible difference in appearance between the overlapping portions and the balance of the photograph, as it appears to be that the exposure effect of the two diminished illuminations which are composited at the overlapped portions are substantially equal to the undiminished illuminations to each side of the overlap, so that the exposure effect on the film is substantially of equal value throughout its entirety.

The exact extent of the overlap forming the juncture of the two exposures is not critical for all practical purposes but it is desirable that the masking attachment be so constructed as to prevent excessive overlap, and it is an object of the invention to accomplish that result.

Referring to the accompanying drawing:

Figure 1 is a front elevation of the masking device and illustrates the pivoted mask in its two operative positions in full and dotted lines.

Figure 2 is a similar view of an alternative construction.

Figure 3 is a transverse sectional view through the base-plate and pivoted mask taken on line 3—3 of Figure 1.

Figure 4 is a similar view taken on line 4—4 of Figure 2.

Figure 5 is a vertical sectional view taken on line 5—5 of Fig. 1.

Figure 6 is a similar view taken on line 6—6 of Figure 2.

Figure 7 is a diagrammatic view indicating a camera lens, masking attachment, field of view and film and showing the manner in which the field of view is masked to provide the desired overlap of the two exposures on the film.

Like numerals of reference indicate the same parts throughout the several figures.

Figure 8:
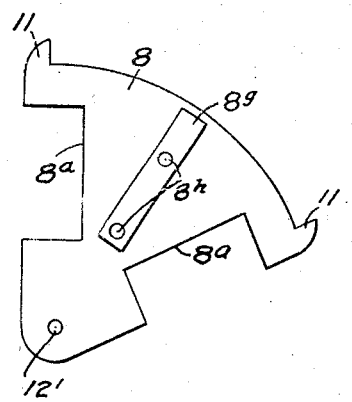
Figure 8 is an elevation of a modified mask.

In order to insure uniformity of the overlap at the juncture of the two exposures so as to result in their proper blending together, it is advisable that the effective lens stop be provided in the masking attachment itself, so that when the attachment is used on a camera lens, the usual iris stop is set wide open. For practical purposes the lens stop provided in the masking attachment may be the equivalent of F11 or about midway between F4 and F22. While this is not critical, it is desirable that the usual iris diaphragm of the lens assembly be set so that its opening is as much larger than the lens stop in the attachment as possible, otherwise the film or plate may not be covered at its outer margins.

Referring to the drawing by reference numerals:

1 indicates the masking device which includes the base-plate 2 which in the example illustrated in Figs. 1–3 and 5 is provided with a lens stop 3.

The base-plate 2 includes a depending portion 4 which is apertured to receive a pin 5 which extends through and to both sides of the base-plate 2 as shown in Figs. 5 and 6.

Formed on the base-plate 2, above and to either side of the depending portion 4 are two flanges 6 which are bent rearwardly from the outer face of the base-plate 2, and are best shown in Figs. 5 and 6. These flanges 6 are disposed at right angles to each other and their purpose is to engage the lens barrel, which is shown in dotted lines in the drawings, in order to correctly center the device thereon.

Pivoted on the pin 5 in rear of the base-plate 2 is a leaf spring 7 which is curved to partially encircle the lens barrel for the purpose of retaining the attachment in operative position thereon.

Pivoted on the pin 5 in front of the base-plate 2 is the swinging mask 8 which is retained thereon as by heading the pin 5. A thin washer 9 may be interposed between the base-plate 2 and the pivoted mask 8 to prevent rubbing engagement between the mask 8 and base-plate 2 and to insure free movement of the mask from one operative position to the other. A stop 10 is formed at the top center of the base-plate 2, and two extensions 11 and 12 are formed at each upper corner of the mask 8 for engagement with the stop 10 as shown in full and dotted lines in Figs. 1 and 2 for the purpose of retaining the mask 8 in its proper operative positions on the base-plate 2 and with respect to the lens stop 3 therein.

The mask 8 is substantially triangular in form and this element, as well as the base-plate 2, may be blanked and formed out of suitable thin metal. The mask 8 is provided with an aperture 12' in its lower portion to receive the pin 5, and in the example shown in Figs. 1 and 5 is provided in both of its diverging edges 13 and 14 with two parallel cuts 15 one of which is slightly above and the other below the lens stop 3 in the base-plate 2 as shown in Fig. 1. Each pair of parallel cuts 15 lie perpendicular to the edge of the mask 8 through which they are cut, and the portion 8' between each pair of cuts is formed outwardly and angularly as shown in Fig. 3, so that its vertical edge 8" is positioned at a substantial distance in front of the base-plate 2 and its lens stop 3 therein. Said parallel cuts 15 extend inwardly to points beyond the lens stop 3, so that the outwardly formed portion 8' does not close off light rays into the lens stop 3.

The outwardly and angularly formed portion 8' of the mask 8 which, when in operative position as shown in Fig. 1, extends substantially across and in front of the lens stop 3 in the base-plate 2, leaves a relatively small area of the stop opening 3 unmasked by the outwardly formed portion 8', so that in operation, the extent of the overlap at the juncture of the two exposures, depends upon the position of the vertical edge 8" of the outwardly formed portion 8' with relation to the lens stop 3 in the base-plate 2 as will be presently described.

Referring now to the example shown in Figs. 2, 4 and 6, the base-plate 2 is the same as in Figs. 1, 3 and 5 with the exception that instead of providing the lens stop 3 therein as in Figs. 1, 3 and 5, the base-plate 2 is provided with a central circular opening 3' while the lens stop 3 is provided in the pivoted mask 8 as best shown in Figs. 4 and 6.

Actually the pivoted mask 8 has duplicate lens stops 3 each one adjacent its diverging edges 13 and 14 which, in operation, are successively brought into operative position in front of the central circular opening 3' in the base-plate 2, the said circular opening being slightly larger than the lens stops 3 in the pivoted mask 8 as shown in Figs. 4 and 6 and in dotted lines in Fig. 2.

In the example shown in Figs. 2, 4 and 6, the pivoted mask 8 has the same general formation as that of Figs. 1, 3 and 5, except that in Figs. 2, 4 and 6, the pivoted mask 8 has an extension on each of its divergent edges 13 and 14, each of which extensions is formed back and over the face of the mask 8 so as to form an outwardly and angularly disposed portion 8' in front of each of the lens stops 3 in the mask 8. As in Fig. 1, the vertical edge 8" of the outwardly formed portion 8' of Fig. 2, which is shown in operative position, lies a substantial distance, for instance about one-half an inch, in front of the lens stop 3 as shown in Fig. 4 and this outwardly formed portion 8' extends substantially across and in front of its adjacent lens stop 3 so as to leave a relatively small area of its adjacent stop opening 3 unmasked as shown in Fig. 2, the width of each of the outwardly formed portions 8' being such as to extend above and below its adjacent lens stop 3, so as to completely mask the same in a vertical direction in the same manner as the outwardly formed portions 8' function in the examples shown in Figs. 1, 3 and 5.

In operation, the device of Fig. 1, is positioned on the lens barrel and retained thereon by the pivoted leaf spring 7 coacting with the flanges 6 on the base-plate 2, so as to substantially position the base-plate 2 against the outer end of the lens barrel and substantially center the lens stop 3 of the base-plate 2 in front of the camera lens, and position the pivotal point of the pivoted mask 8 directly under the center of the said lens stop 3.

When in this position, the pivoted mask 8 will, by gravity, assume one of its operative positions as for instance that shown in full lines in Fig. 1, with the edge 8" of the outwardly formed portion 8' of the mask 8 lying in a substantially vertical position and the said outwardly formed portion 8' substantially masking the lens stop 3 in the base-plate 2 with the exception of a relatively small area thereof as shown in Fig. 1.

Referring now to Fig. 7, the entire field of view is indicated by the full and dotted line A, B and the camera film is indicated by the dotted and full line C, D. The base-plate 2, its lens stop 3, pivoted mask 8, its outwardly formed portion 8' and its vertical edge 8" are diagrammatically shown in front of the camera lens L. In this Fig. 7, the mask 8 is shown in one of its operative positions in full lines and in its other operative position in dotted lines.

Assuming that the device is in its operative position as in Fig. 1, and as just previously described, so much of the field of view as is indicated by the dotted lines E, B will be masked by the outwardly formed portion 8' of the mask 8 which is shown in full lines in Fig. 7, and the light rays from that portion of the field of view which is indicated by the full line A, E will be permitted by the portion 8' of the mask 8 to enter the lens stop 3, so that only that portion of the film indicated by the full line F, D will be exposed upon exposure operation of the camera shutter. When the mask 8 is moved into the position shown in dotted lines in Fig. 1, the outwardly formed portion 8' of the opposite divergent edge 14 thereof is brought into operative position in front of the lens stop 3 in the base-plate 2, which position of said mask 8 is shown in dotted lines in Fig. 7.

When in this dotted line position, so much of the field of view as is indicated by the full line A, G is masked by the outwardly formed portion 8' of the mask 8, and so much of the film as is indicated by the full line H, D is not exposed upon exposure operation of the lens shutter, while the light rays from that part only of the field of view indicated by the line, G, E, B are permitted to enter the lens stop 3 and that part only of the film which is indicated by the line C, F, H is exposed upon exposure operation of the lens shutter. Thus the light rays from that central part of the field of view indicated by the line G, E is not masked by the masking device in either of its two masking positions and consequently such unmasked portion of the field of view becomes overlapped on the film by the successive exposures as indicated by the line F, H. It will be seen from Fig. 7, that the position of the vertical edge 8" of the outwardly formed portion 8' of the mask 8 with respect to the lens stop 3 determines the extent of the overlap F, H of the exposures on the film C, D, and that the extent of such overlap can be increased or diminished by depressing or raising the outwardly formed portion 8' of the mask 8 which results in a lateral adjustment of the effective edges 8" of the said outwardly formed portions 8', as shown in full and dotted lines in Figs. 3 and 4, so as to cause the outwardly formed portion 8' of the mask 8 to cover or mask a less or greater area of the lens stop 3 in the base-plate 2, whereby the desired blending of the juncture of the two exposures may be effected.

The illustration and description of Fig. 7 is likewise applicable to the example shown in Figs. 2, 4 and 6, so that it need not be further applied thereto.

In the use of the device, the subject to be photographed is placed in that side of the field of view which is not masked by the device, and the lens shutter is operated to effect an exposure of the film of the unmasked portion of the field of view. The mask 8 is then swung on its pivot into its other operative position, as for instance into the position as shown in dotted lines in Figs. 1 and 2. The subject is then placed in the other side of the field of view which is now unmasked by the masking device and the lens shutter again operated to effect exposure of that part of the film which was previously masked during the first exposure. The two exposures will overlap sufficiently to effect a proper blending of the two at their juncture.

It is to be understood that in the use of the device to produce a photograph of a subject in two positions which will have the appearance of a single exposure, the camera should be mounted in a tripod or other rigid support and care taken to prevent movement of the camera during the interval between the two exposures, and in order not to disturb the proper overlap of the exposures, the usual iris lens diaphragm should be opened to F4 and in any event opened so as to provide the largest aperture possible.

In such lens assemblies wherein the character of the lens requires that the largest lens stop is less than F4, for instance, F12.5, the relatively small aperture provided by such a lens stop may preclude the use of an effective lens stop in the masking attachment itself. In such instances, it is advisable to enlarge the lens stop aperture 3 (Fig. 1) to nearly the diameter of the lens barrel, so that the edge 8" of the mask cooperates with the iris lens stop of the lens assembly in the same manner as it cooperates with the lens stop 3 in the masking attachment to effect the proper masking of the field of view and provide a satisfactory overlap at the juncture of the two exposures in the manner as diagrammatically illustrated in Fig. 7. In such case the extent of overlap may be controlled by depressing or lifting the edge 8" of the outwardly formed portion 8' of the mask 8, as illustrated in full and dotted lines in Fig. 3.

However, in order to effect the most correct position of the mask with respect to the lens stop opening 3 in the base-plate 2 or with respect to the usual iris lens stop of the lens assembly so that the correct extent of the normal field of view will be masked at each of the two exposures to obtain the proper overlapping and merging of said exposures, it is advisable to provide for an adjustment of the position of the effective edge 8" of the mask with respect to the lens stop opening in the base-plate 2 or with respect to the usual iris lens stop of the lens assembly.

Provision for such adjustment is illustrated in Figs. 8 to 12.

Figure 10:
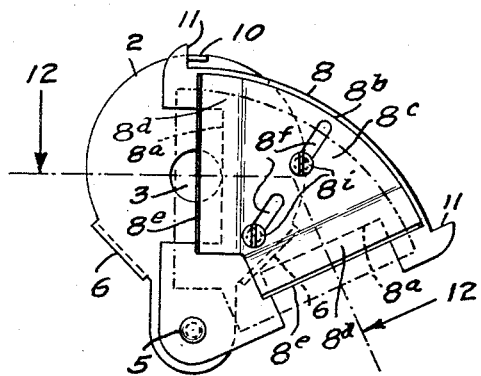
Figures 10 and 11 are elevations of modifications.
Figure 11:
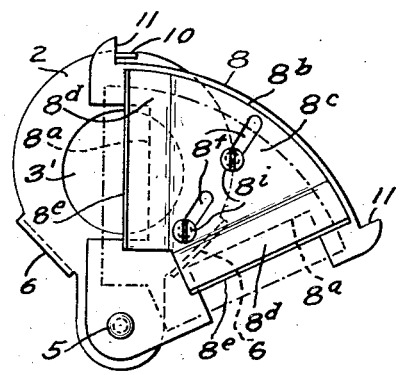

In Fig. 8, a modified mask 8 is illustrated wherein the side portions are cut away to provide side edges 8ᵃ, so that when the mask 8 is assembled on the base-plate 2, each side edge 8ᵃ will not extend over the lens stop opening 3 in the base-plate 2, as shown in dotted lines in Fig. 10, but will extend partially over the larger opening 3' in the base-plate 2 in such assemblies in which the mask cooperates with the usual iris lens stop of the lens assembly, not shown, instead of with a lens stop 3 provided in the base-plate 2, as in Fig. 11.

Figure 9:
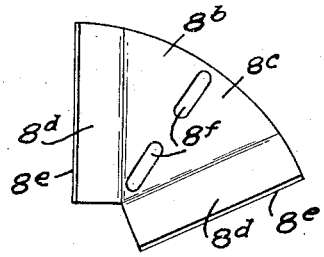
Fig. 9 is an elevation of an auxiliary mask.

In both these cases, the side edges 8ᵃ of the mask 8 are not the effective masking edges of the mask, as these are supplied by the auxiliary mask 8ᵇ, which is shown in Fig. 9.

This element includes a flat central portion 8ᶜ and outwardly formed edge portions 8ᵈ which terminate in side edges 8ᵉ, while two elongated slots 8ᶠ are provided along the center line of the flat central portion 8ᶜ.

Figure 12:
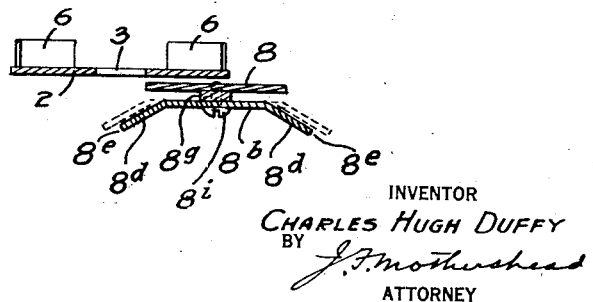
Figure 12 is a sectional view on line 12—12 of Fig. 10.

This auxiliary mask 8ᵇ is assembled on the face of the modified mask 8 as shown in Figs. 10, 11 and 12 and is capable of being adjusted in a radial direction thereon. The modified mask 8 is preferably provided along the center line thereof with a narrow metal strip 8ᵍ and two tapped holes 8ʰ with which the two slots 8ᶠ in the auxiliary mask 8ᵇ register, said strip 8ᵍ serving to space the auxiliary mask 8ᵇ from the modified mask 8 as well as to provide additional depth to the tapped holes 8ʰ so as to provide sufficient threads to receive the two screws 8ⁱ which pass through the two slots 8ᶠ in the auxiliary mask 8ᵇ.

The auxiliary mask 8ᵇ is so dimensioned that when it is assembled on the modified mask 8 and set by the screws 8ⁱ in its outermost position, as shown in full lines in Figs. 10 and 11, each of its outwardly formed side edges 8ᵉ, when in operative positions, will lie in a vertical line substantially in front of the center of the lens stop opening 3 in the base-plate 2 as in Fig. 10, or substantially in front of the center of the large opening 3' in the base-plate 2, as in Fig. 11.

It will be seen, however, that adjustment of the auxiliary mask 8ᵇ inwardly of the modified mask 8 causes both side edges 8ᵉ thereof to be extended laterally an equal distance, as indicated in dotted lines in Figs. 10, 11 and 12. Thus the side portions 8ᵈ and their effective masking edges 8ᵉ of the auxiliary mask $3^b$ may be set at the position which most effectively masks the correct area of the normal field of view which will result in the proper overlapping of the two exposures to effect the desired blending or merging thereof, so that there will be neither over nor under exposure at their overlap and no discernible juncture of the two exposures.

It will thus be seen from Figs. 1, 3, 10, 11 and 12 that the extent of the masking of the normal field of view from a camera lens and film is accomplished by increasing or diminishing the effective area of the mask so as to extend or retract its effective masking edges without bodily movement of the mask from either of its two operative positions, and it will also be seen from said figures that when the mask is either increased or diminished in effective area its effective masking edge portion, when in one of its operative positions, will lie in a plane in front of the camera lens which will always be parallel with the effective masking edge portion of the mask when in its other operative position, whereby the extent of the overlap of an image on a camera film may be increased or diminished and such overlap maintained uniform in width throughout its length.

While I have indicated one expedient for attaching the device to the lens barrel of a camera, it is obvious that any other suitable means may be employed to accomplish that purpose.

It is also obvious that various other changes may be made in the construction and arrangement of the two examples of the device as herein shown and described, and I consider myself clearly entitled to all such changes and modifications as fall within the limit and scope of the appended claims.

I claim:

1. A camera lens attachment for masking a portion of the normal field of view from a camera lens so that a portion only of a camera film will be exposed upon an exposure operation of a camera shutter, which includes a base-plate having means for centering the same on and in front of the barrel of a camera lens, and provided with a lens-stop opening to admit light rays to a camera lens, means cooperating with the base-plate centering means for attaching the base-plate to the barrel of a camera lens, a mask, means for pivoting the mask on the base-plate so that the mask may swing on its pivot in front of the base-plate and the lens-stop opening therein, a stop on the base-plate and means on the mask cooperating with said stop to limit the swing of said mask from side to side, said mask including two outwardly and angularly formed portions which are adapted to be successively brought into position in front of the said lens-stop opening upon swinging movement of the mask on its pivot the effective edges of the said outwardly and angularly formed portions lying in a plane in front of the lens stop opening in the base plate, whereby said effective edges cooperate with the lens stop opening in the base plate to effect a masking of the field of view and control the extent of the masking of the camera film upon lateral adjustment of the said outwardly and angularly formed portions, the whole arranged so that the normal field of view to one side of its center is masked from the camera lens and film by one of the said outwardly and angularly formed portions of the mask and the normal field of view to the opposite side of its center is masked from the camera lens and film by the other of the said outwardly and angularly formed portions of the mask.

2. A camera lens attachment for masking a portion of the normal field of view from a camera lens so that a portion only of a camera film will be exposed upon an exposure operation of a camera shutter, which includes a base-plate having means for centering and attaching the same on and in front of the barrel of a camera lens and provided with a lens-stop opening to admit light rays to a camera lens, a mask, means for pivoting the mask on the base-plate so that the mask may swing on its pivot in front of the base-plate and the lens-stop opening therein, a stop on the base-plate and means on the mask for cooperation with the stop on the base-plate to limit the swing of the mask and position the same in two positions with respect to the base-plate and the lens-stop opening therein, said mask including two outwardly and angularly formed portions adapted to be successively brought into position in front of the said lens-stop opening upon swinging movement of the mask from one of its two positions to the other the effective edges of the said outwardly and angularly formed portions lying in a plane in front of the lens stop opening in the base plate, whereby said effective edges cooperate with the lens stop opening in the base plate to effect a masking of the field of view and control the extent of the masking of the camera film upon lateral adjustment of the said outwardly and angularly formed portions, the whole arranged so that a portion of the normal field of view is masked from the camera lens and film by one of the said outwardly and angularly formed portions of the mask when the mask is in one of its two positions, and another portion of the normal field of view is masked from the camera lens and film by the other of said outwardly and angularly formed portions of the mask when the mask is in the other of its two positions.

3. A camera lens attachment for masking a portion of the normal field of view from a camera lens so that a portion only of a camera film will be exposed upon an exposure operation of a camera shutter, which includes a base-plate and means for securing the same in front of the lens barrel of a camera lens, the base-plate being provided with a lens-stop opening to admit light rays to a camera lens, a mask, means for pivoting the mask on the base-plate so that the mask may swing on its pivot in front of the base-plate and the lens-stop opening therein, means for limiting the swing of the mask on its pivot to position the mask in two positions with respect to the base-plate and the lens-stop opening therein, said mask including two outwardly and angularly formed portions adapted to be successively brought into position in front of said lens-stop opening upon swinging movement of the mask from one of its two positions to the other, the effective edges of the said outwardly and angularly formed portions lying in a plane in front of the lens stop opening in the base plate, whereby said effective edges cooperate with the lens stop opening in the base plate to effect a masking of the field of view and control the extent of the masking of the camera film upon lateral adjustment of the said outwardly and angularly formed portions, the whole arranged so that a portion of the normal field of view is masked from the camera lens and film by one of the said outwardly and angularly formed portions of the mask when the mask is in one of its two positions, and another portion of the normal field of view is masked from the camera lens and film by the other of said outwardly and angularly formed portions of the mask when the mask is in the other of its two positions.

4. A camera lens attachment for masking a portion of the normal field of view from a camera lens so that a portion only of a camera film will be exposed upon an exposure operation of a camera shutter which includes a base-plate and means for securing the same in front of the lens barrel of a camera lens, the base-plate being provided with a lens-stop opening to admit light rays to a camera lens, a mask, means for pivoting the mask on the base-plate so that the mask may swing on its pivot in front of the base-plate and lens-stop opening therein, means for limiting the swing of the mask on its pivot to position the mask in two positions with respect to the base-plate and lens-stop opening therein, the effective edges of the mask lying in a plane in front of the normal planes of the mask and of the lens stop opening in the base plate and co-operating with said lens stop opening to effect a masking of the field of view, said effective edges being adjustable relatively to the mask and lens stop opening in the base plate to increase or diminish the extent of the masking of the field of view from the camera film whereby a portion of the normal field of view is masked from the camera lens and film by the mask when the mask is in one of its two positions, and another portion of the normal field of view is masked from the camera lens and film when the mask is in the other of its two positions.

5. A camera lens attachment for masking a portion of the normal field of view from a camera lens so that a portion only of a camera film will be exposed upon an exposure operation of a camera shutter, which includes a base-plate and means for securing the same in front of the lens barrel of a camera lens, the base-plate being provided with a lens-stop opening to admit light rays to a camera lens, a mask attached to the base-plate and movable thereon so that the mask may be moved in front of the base-plate and lens-stop opening thereon, means for limiting the movement of the mask to position the same in two positions with respect to the base-plate and lens-stop opening therein, the effective edges of the mask lying in a plane in front of the normal plane of the mask and of the lens stop in the base plate and cooperating therewith to effect a masking of the field of view, said effective edges being adjustable relatively to the mask and lens stop opening in the base plate to increase or diminish the extent of the masking of the field of view from the camera film whereby a portion of the normal field of view is masked from the camera lens and film by the mask when the mask is in one of its two positions, and another portion of the normal field of view is masked from the camera lens and film when the mask is in the other of its two positions.

6. A camera lens attachment for masking a portion of the normal field of view from a camera lens so that a portion only of a camera film will be exposed upon an exposure operation of a camera shutter, which includes a base-plate and means for securing the same in front of the lens barrel of a camera lens, the base-plate being provided with an opening therein to admit light rays to a camera lens, a mask, means for pivoting the mask on the base-plate so that the mask may swing on its pivot in front of the base-plate and the opening therein, means for limiting the swing of the mask on its pivot to position the mask in two positions in front of the camera lens, the effective edges of the mask lying in a plane in front of the normal planes of the mask and of the lens stop opening in the base plate and cooperating with the lens stop opening, said edges being adjustable to increase or diminish the extent of the masking of the field of view from the camera film whereby a portion of the normal field of view is masked from the camera lens and film by the mask when the mask is in one of its two positions, and another portion of the normal field of view is masked from the camera lens and film when the mask is in the other of its two positions.

7. A camera lens attachment for masking a portion of the normal field of view from a camera lens so that a portion only of a camera film will be exposed upon an exposure operation of a camera shutter, which includes a base-plate and means for securing the same in front of the lens barrel of a camera lens, the base-plate being provided with an opening to admit light rays to a camera lens, a mask, means for movably mounting the mask on the base-plate so that the mask may be moved in front of the base-plate and camera lens, said mask including two outwardly and angularly formed portions, adapted to be successively brought into position in front of the camera lens, means for limiting the movement of the mask to position the same in two positions in front of the camera lens, the effective edges of the said outwardly and angularly formed portions lying in a plane in front of the base plate, whereby said effective edges cooperate with the lens and lens stop to control the extent of the masking of the camera film upon lateral adjustment of the said outwardly and angularly formed portions the whole arranged so that a portion of the normal field of view is masked from the camera lens and film by the mask when the mask is in one of its two positions and another portion of the normal field of view is masked from the camera lens and film when the mask is in the other of its two positions.

8. A camera lens attachment for masking a portion of the normal field of view from a camera lens so that a portion only of a camera film will be exposed upon an exposure operation of a camera shutter, which includes a pivoted mask, means for mounting the mask so that it will swing on its pivot in front of a camera lens, means for limiting the swing of the mask to position the same in two positions, said mask including two outwardly and angularly formed portions adapted to be successively brought into position in front of the camera lens, the effective edges of the said outwardly and angularly formed portions controlling the extent of the masking of the camera film upon lateral adjustment of said outwardly and angularly formed portions to mask more or less of the camera lens whereby a portion of the normal field of view is masked from the camera lens and film when the mask is in one of its two positions and another portion of the normal field of view is masked from the camera lens and film when the mask is in the other of its two positions.

9. A camera lens attachment for masking a portion of the normal field of view from a camera lens so that a portion only of a camera film will be exposed upon an exposure operation of a camera shutter, which includes a base-plate having an opening therein to admit light rays to a camera lens, means for securing the base-plate in front of a camera lens, a mask, means for pivoting the mask to said base-plate, means for limiting the swing of the mask on its pivot to position the mask in two positions in front of the opening in the base-plate, said mask including two outwardly and angularly formed portions and provided with a lens-stop opening therein in the rear of each outwardly and angularly formed portion of the mask, each outwardly and angularly formed portion of the mask and its associated lens-stop opening being adapted to be successively brought into its two positions in front of said opening in said base-plate, whereby a portion of the normal field of view is masked from the camera lens when the mask is in one of its two positions, and another portion of the normal field of view is masked from the camera lens when the mask is in the other of its two positions.

10. A camera lens attachment for masking a portion of the normal field of view from a camera lens so that a portion only of a camera film will be exposed upon an exposure operation of a camera shutter, which includes a mask and means for mounting the mask in front of a camera lens, means for pivoting the mask on said mounting means, means for limiting the swing of the pivoted mask to position the same in two positions in front of a camera lens, the mask including two outwardly and angularly formed portions and provided with a lens-stop opening in the rear of each of the outwardly and angularly formed portions of the mask, said outwardly and angularly formed portions and their associated lens-stop openings being adapted to be successively brought into position in front of a camera lens, whereby a portion of the normal field of view is masked from the camera lens when the mask is in one of its two positions and another portion of the normal field of view is masked from the camera lens when the mask is in the other of its two positions.

11. A camera lens attachment for masking a portion of the normal field of view from a camera lens so that a portion only of a camera film will be exposed upon an exposure operation of a camera shutter, which includes a mask and means for mounting the mask in front of a camera lens, means for pivoting the mask on said mounting means, means for limiting the swing of the pivoted mask to position the same in two positions in front of a camera lens, the mask being provided with two openings to permit entrance of light rays to a camera lens, and including a masking portion in front of each of said openings adapted to be successively brought into position in front of a camera lens, whereby a portion of the normal field of view is masked from the camera lens when the mask is in one of its two positions, and another portion of the normal field of view is masked from the camera lens when the mask is in the other of its two positions.

12. A device for masking first one portion and then another portion of the normal field of view from a camera lens, which includes a masking means adapted to be movably mounted in front of a camera lens in two operative positions, said masking means including a masking element and an auxiliary mask mounted on said masking element, said auxiliary mask having two side portions and edges adapted to be successively positioned in front of a camera lens, means for effecting adjustment of the auxiliary mask on the masking element to adjust said side portions and edges to different positions in front of a camera lens, whereby a portion of the normal field of view is masked from a camera lens when the masking means is in one of its operative positions and another portion of the normal field of view is masked from a camera lens when the masking means is in the other of its operative positions.

13. A device for masking first one portion and then another portion of the normal field of view from a camera lens which includes a pivoted masking means adapted to be mounted in front of a camera lens in two operative positions, said masking means including a masking element and an auxiliary mask mounted on said masking element, said auxiliary mask having two side portions and edges adapted to be successively positioned in front of a camera lens, means for effecting adjustment of the auxiliary mask on the masking element to adjust said side portions and edges to different positions in front of a camera lens, whereby a portion of the normal field of view is masked from a camera lens when the masking means is in one of its operative positions and another portion of the normal field of view is masked from a camera lens when the masking means is in the other of its operative positions.

14. A device for masking first one portion and then another portion of the normal field of view from a camera lens, which includes a rotatable masking means adapted to be mounted in front of a camera lens in two operative positions, said masking means including a masking element and an auxiliary mask mounted on said masking element, said auxiliary mask having two side portions and edges adapted to be successively positioned in front of a camera lens, means for effecting adjustment of the auxiliary mask on the masking element to adjust said side portions and edges to different positions in front of a camera lens, whereby a portion of the normal field of view is masked from a camera lens when the masking means is in one of its operative positions and another portion of the normal field of view is masked from a camera lens when the masking element is in the other of its operative positions.

15. A camera lens attachment for masking first one portion and then another portion of the normal field of view from a camera lens and film, which includes a mask and means for pivotally mounting the mask in front of a camera lens, means for stopping the pivotal movement of the mask in two masking positions so that the effective masking edge portion, when in one masking position, will lie in a plane which is parallel with the effective masking edge portion of the mask when in its other masking position, said pivoted mask including means for increasing or diminishing the effective area thereof to mask more or less of the normal field of view from a camera lens and film and to still maintain the effective masking edge portion of the mask, when in one masking position, in a plane which is parallel with the effective masking edge portion of the mask when in its other masking position when the mask is either increased or diminished in effective area, whereby the extent of overlap of an image on a film may be increased or diminished and such overlap maintained uniform in width throughout its length.

16. A device for masking first one and then another portion of the normal field of view from a camera lens and film, which includes a masking element and means for mounting the same in front of a camera lens, the masking element being rotatable into two masking positions, means for stopping the rotatable movement of the masking element in both masking positions, the rotatable masking element including means for increasing or diminishing its effective area to mask more or less of the normal field of view from a camera lens and film and for maintaining the effective masking edge portion of the masking element, when in one masking position, in a plane which is parallel with the effective masking edge portion of the masking element when in its other masking position when the masking element is either increased or diminished in effective area, whereby the extent of overlap of an image on a film may be increased or diminished and such overlap maintained uniform in width throughout its length.

17. A device for masking first one and then another portion of the normal field of view from a camera lens and film, which includes a masking element rotatably mounted in front of a camera lens, means for limiting the rotation of the masking element to successively stop the same in two masking positions, the rotatable masking element including means for adjusting its masking edge portions to increase or diminish its effective area for increasing or diminishing the extent of the masking of the field of view from a camera lens and film when the masking element is stopped in either of its two masking positions, and for maintaining the masking edge portion of the masking element, when in one of its masking positions, in a plane which is parallel with the plane of the masking edge portion of the masking element when in its other masking position when the masking edge portions of the masking element are in any position of adjustment, whereby the extent of the overlap of an image on a film may be increased or diminished and such overlap maintained uniform in width throughout its length.

18. A device for masking first one and then another portion of the normal field of view from a camera lens and film which includes a masking element adapted to be rotated into two masking positions in front of a camera lens, the rotatable masking element including means for adjusting its masking edge portions to increase or diminish its effective area to mask more or less of the normal field of view from a camera lens and film and, when the effective area of the masking element is either increased or diminished, to maintain the effective masking edge portion of the masking element, when rotated into one masking position, in a plane which is parallel with the effective masking edge portion of the masking element when it is rotated into the other masking position, whereby the extent of overlap of an image on a camera film may be increased or diminished and such overlap maintained uniform in width throughout its length.

19. A device for masking first one and then another portion of the normal field of view from a camera lens and film, which includes a single masking element and means for movably mounting the same in front of a camera lens, said single masking element having two outside edge portions, means for stopping the bodily movement of the single masking element in two masking positions so that in one such position one of its outside edge portions becomes the effective masking portion, while in the other of such positions the other of its outside edge portions becomes the effective masking portion, the single masking element including means for increasing or diminshing its effective area without bodily movement thereof from either of its two masking positions to mask more or less of the normal field of view from a camera lens and film and, when the single masking element is either increased or diminished in effective area, to maintain the outside edge portion of the masking element which is in masking position, in a plane which is parallel with the other outside edge portion when it is moved into masking position, whereby the extent of overlap of an image on a camera film may be increased or diminished and such overlap maintained uniform in width throughout its length.

20. A device for masking first one and then another portion of the normal field of view from a camera lens and film, which includes a single masking element having two outside edge portions and means for movably mounting the single masking element in two operative positions in front of a camera lens so that in one such position one of its outside edge portions becomes the effective masking portion, while in the other of such positions the other of its outside edge portions becomes the effective masking portion, said single masking element including means for increasing or diminishing its effective area to adjust its outside edges to different positions in front of a camera lens to mask more or less of the normal field of view from a camera lens and film and for establishing each outside edge, when in any adjusted masking position, in a plane which is parallel with the other outside edge when it is in any adjusted masking position, whereby the extent of the overlap of an image on a camera film may be increased or diminished and such overlap maintained uniform in width throughout its length.

21. A device for masking first one portion and then another portion of the normal field of view from a camera lens and film, which includes a masking element adapted to be movably mounted in two operative positions in front of a camera lens, the masking element including means for increasing or diminishing its effective area by extending or retracting its effective masking edges so as to mask more or less of the normal field of view from a camera lens and film and for establishing each masking edge, when extended or retracted and in masking position, in a plane which is parallel with the other masking edge when extended or retracted and in masking position, whereby the extent of overlap of an image on a film may be increased or diminished and such overlap maintained uniform in width throughout its length.

CHARLES HUGH DUFFY.

REFERENCES CITED

The following references are of record in the file of this patent:

UNITED STATES PATENTS

| Number | Name | Date |
|---|---|---|
| 592,934 | Minott | Nov. 2, 1897 |
| 1,533,433 | Linden | Apr. 14, 1925 |
| 50,284 | Shive | Oct. 3, 1865 |

FOREIGN PATENTS

| Number | Country | Date |
|---|---|---|
| 8,247 | Great Britain | Apr. 6, 1909 |
| 782,740 | France | Mar. 25, 1935 |